Aug. 20, 1963   E. H. KURT   3,101,006
DRILL MOUNTING
Filed Oct. 13, 1960   3 Sheets-Sheet 1
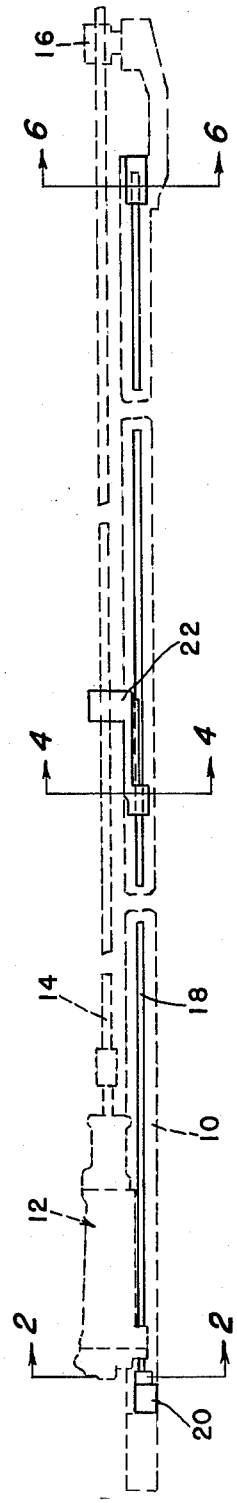
FIG. 1
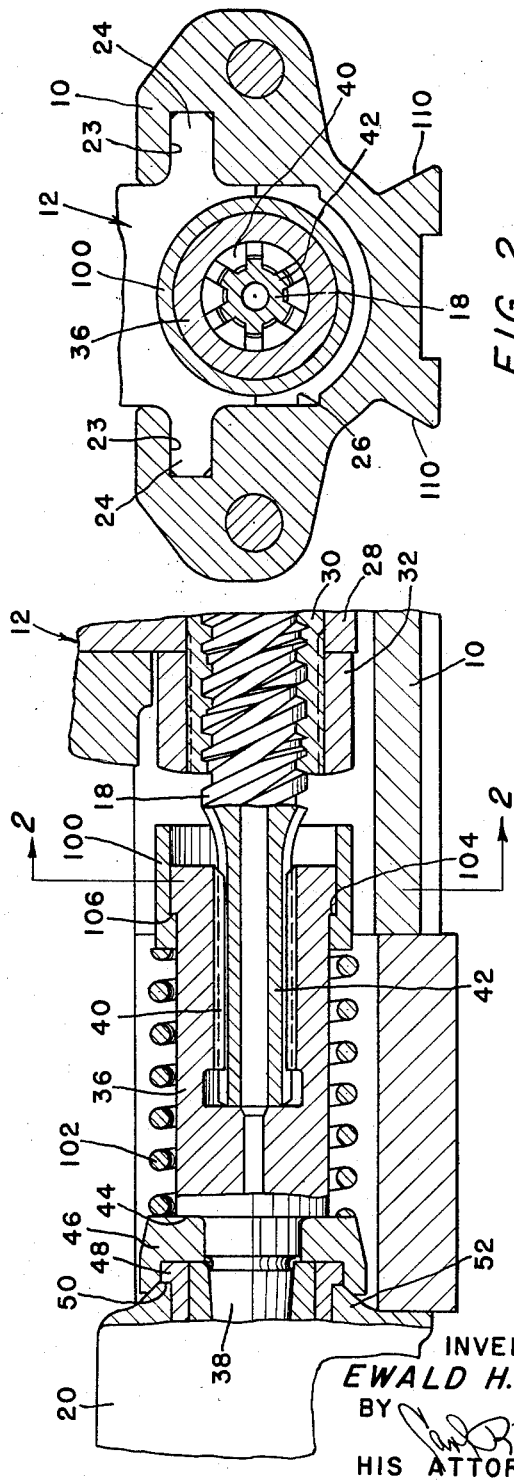
FIG. 2
FIG. 3
INVENTOR
*EWALD H. KURT*
BY
HIS ATTORNEY

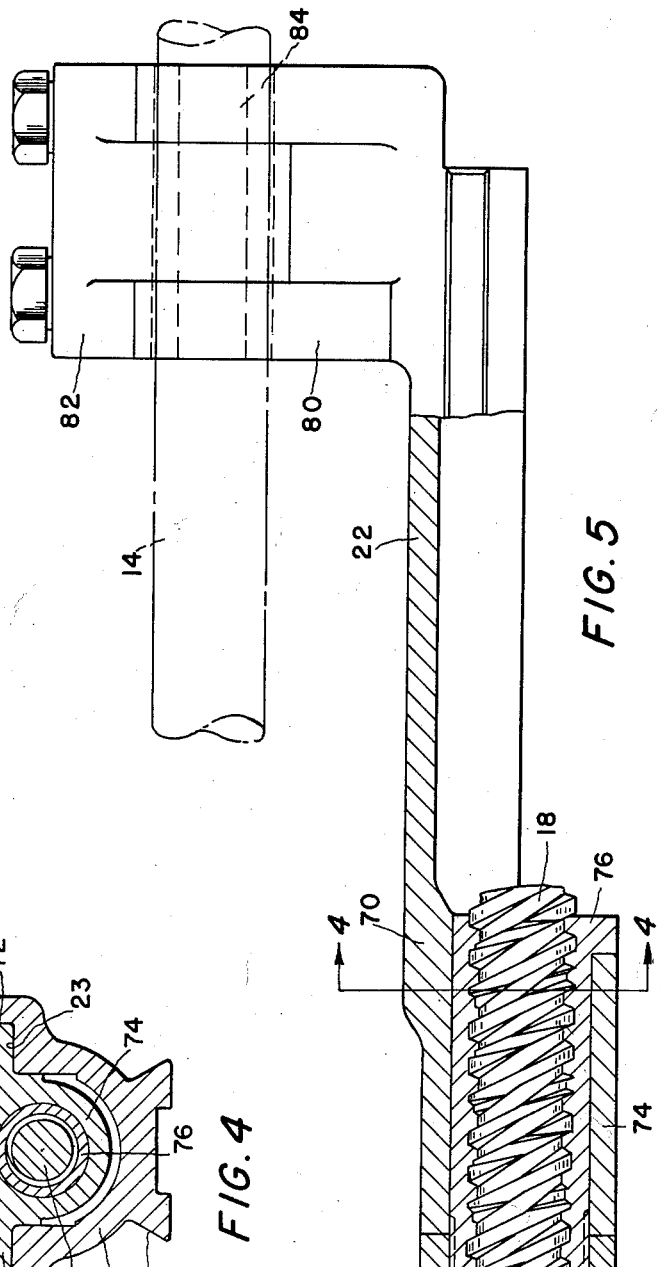

United States Patent Office 3,101,006
Patented Aug. 20, 1963

3,101,006
DRILL MOUNTING
Ewald H. Kurt, Phillipsburg, N.J., assignor to Ingersoll-Rand Company, New York, N.Y., a corporation of New Jersey
Filed Oct. 13, 1960, Ser. No. 62,361
2 Claims. (Cl. 74—424.8)

This invention relates to mountings for rock drills, and particularly for rock drills of the percussive type which are adapted to acuate a drill rod extending therefrom.

Drill mountings of the type to which this invention relates are often relatively long to enable drill rods to be used which are adapted to operate continuously to drill a relatively deep hole without changing of the rods. Such mountings usually comprise a guide member upon which the drill is slidingly mounted and advanced by means of a feed screw. The feed screw and the drill rod are both long and are therefore relatively flexible and free to vibrate. Vibration of the drill, feed screw and the drill rod causes excessive wear on the feed screw, as well as loss of power due to the flexing of the drill rod.

It is an object of this invention to eliminate or at least to minimize vibration and flexing of the drill rod and feed screw.

To this end in a preferred embodiment of the invention, a centralizer is movably mounted on the guide shell which acts as a steady rest for the feed screw and for the drill rod. Means is provided to advance the centralizer as the drill advances, but at a slower rate of speed than the drill so that it will continue to support these elements at an intermediate point of their unsupported length, throughout the travel of the drill along the guide shell.

Figure 7:
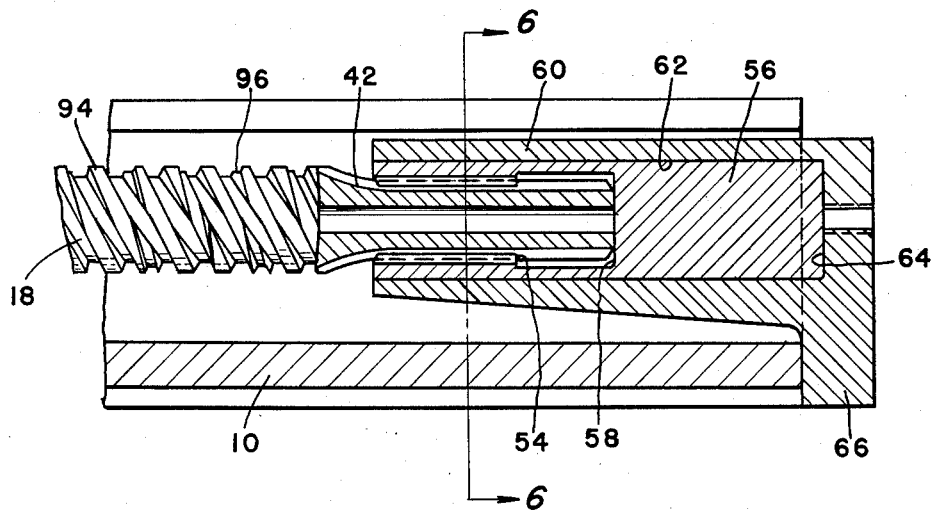
Figure 6:
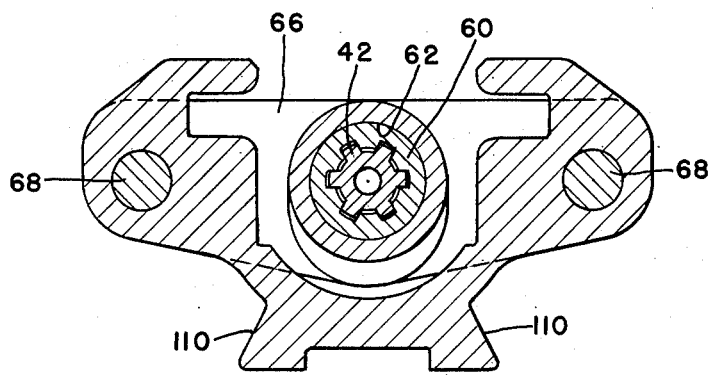

The invention will be more completely understood by reference to the following description taken with the drawings in which:

FIGURE 1 is an elevational view of a preferred form of the invention showing the drill and drill rod in dotted lines mounted on the guide shell and indicating the character of the centralizer, FIG. 2 is an enlarged transverse section of the invention taken along the line 2—2 of FIGS. 1 and 3 looking in the direction of the arrows, FIG. 3 is a longitudinal vertical section at the driven end of the feed screw showing portions of the driving motor and the rear end of the drill, FIG. 4 is a cross section taken at the line 4—4 of FIGS. 1 and 5 looking in the direction of the arrows, FIG. 5 is a longitudinal vertical section of the centralizer, FIG. 6 is a cross section through the forward end of the feed screw and guide shell taken along the line 6—6 of FIGS. 1 and 7 looking in the direction of the arrows, and FIG. 7 is a longitudinal vertical section of the feed screw at its front end and the guide shell.

Referring to the drawings, FIG. 1 indicates the type of drill mounting and drill to which this invention relates, it being adapted to be used in conditions where very deep or relatively deep drill holes are desired, whereby the use of correspondingly long lengths of drill rods or steels minimizes the changing of steels. As indicated, a drill guide 10 slidingly supports a percussive type of drill 12 at the forward end of which projects a drill rod 14 extending longitudinally along the drill guide 10. At the forward end of guide shell 10 is provided a centralizer 16 of conventional form by which the forward end of drill rod 14 is steadied in the vicinity of the mouth of the drill hole (not shown). A feed screw 18 threadingly engages and advances the drill 12 and is rotated by a suitable motor 20.

This invention provides a second centralizer 22 intermediate drill 12 and the forward centralizer 16 and slidable on guide 10. This centralizer 22 not only acts as a centralizer or steady rest for rod 14 but is actuated by and acts as a steady rest for the feed screw 18.

For slidingly supporting drill 12, the guide shell 10 is provided with grooves 23 to receive laterally extending wings 24 formed at the rear of drill 12. It has also a longitudinally extending trough 26 to receive a boss 28 extending downwardly from drill 12 and within which is inserted the usual feed nut 30 for engagement with feed screw 18. Nut 30 is held in place in boss 28 by a lock nut 32.

In the usual manner rotation of feed screw 18 advance drill 12. To drive the feed screw 18, a motor 20 is mounted rearwardly of guide shell 10 and engages feed screw 18 by means of a chuck 36 formed integrally with the motor shaft 38 and fluted as at 40 to engage the fluted end 42 of feed screw 18. The thrust of feed screw 18 is taken by chuck 36 and the rear face 44 of chuck 36 bears against a collar 46 mounted on motor shaft 38 and abutting motor bearing 48. The bearing 48 is flanged at 50 to bear against the housing end 52 of motor 20.

The front end of feed screw 18 is similar to the rear end, and has its fluted end 42 fitting into the fluted portion 54 of a bearing plug 56 with the endwise thrust being taken by the bottom face 58 within plug 56. Bearing plug 56 is rotatably mounted in a bracket 60 having a bore 62 to receive plug 56, the end face 64 within bore 62 being adapted to take the thrust of bearing 56.

For attachment to shell 10, bracket 60 is provided with a flange 66 which it bolted by cap screws 68 to the end face of the guide shell.

From the above description it will be obvious that as drill 12 is advanced by rotation of feed screw 18, the rear end face of feed screw exerts pressure against chuck 36. On withdrawal of drill 12 by reversing the direction of rotation of feed screw 18, the front end of feed screw 18 is under compression and is apt to buckle unless properly steadied. Likewise as drill 12 advances, drill rod 14 is under compression and, being very long, there is likewise the tendency for it to buckle, such flexibility resulting in a loss of power. Centralizer 22 is adapted to obviate these conditions.

The centralizer 22 is provided with a body portion 70 extending lengthwise of guide shell 10 and slidably mounted thereon by means of wings 72 fitting grooves 23. A boss 74 formed integrally with body portion 70 is provided with a nut 76 threadingly engaging feed screw 18 so as to be advanced and retracted by rotation thereof. The forward end of the body portion 70 terminates in a drill steel receiving portion in the form of a loose clamp having a stationary jaw 80 and a hinged jaw 82 having a hinge pivot 84. The swingable jaw 82 permits insertion of drill rod 14 within a two part bushing 86 loosely conforming to the outer diameter of drill 14 and held in portions 80 and 82 of the clamp. A clamping bolt 88 is pivotally mounted at 90 in the stationary jaw 80 and extends through jaw 82 to hold the jaws together.

Means is provided to advance drill 12 and centralizer 22 at different speeds, that is to say, centralizer 22 is preferably advanced more slowly than drill 12. In this instance, it is desired that the centralizer move about half as fast as drill 12. To this end, feed screw 18 is provided with two sets of superposed threads 94, 96, one having half the pitch of the other, assuming each is a single thread. It is of course possible to obtain the same result in an arrangement in which, for example, the nut 30 has a lead of .5 inch and a triple thread, and the nut 76 for the centralizer 22 has a lead of .75 inch with a single thread. In this case one rotation of the feed screw 18 will cause the nut 30 to move 1.5 inches (3×.5) and the nut 76 will move .75 inch. In any event the thread combination is chosen such that as feed screw 18 rotates, drill 12 will advance more rapidly than centralizer 22, the latter remaining substantially midway of the unsupported length of drill rod 14 and of feed screw 18 thereby cutting down vibration of those two elements.

Means is provided to prevent sudden shock as drill 12 reaches the end of its travel on retraction by feed screw 18. To this end, chuck 36 is provided with a sleeve 100 held forwardly thereon by a very stiff spring 102 encircling chuck 36 and bearing against collar 46 at its rearward end. Buffer sleeve 100 is adapted to project beyond chuck 36 and to engage nut 32 with sufficient resistance to overcome the power of motor 20 and thus avoid injury due to jamming of feed nut 32 against chuck 36. To hold sleeve 100 in place, that sleeve is provided with internal shoulder 104 to engage an external shoulder 106 on chuck 36.

The threads of feed screws become worn inasmuch as the pressure applied in one direction are usually greater than those in the other, and a great advantage of this construction is that feed screw 18 can be reversed since it is in design exactly the same at the two ends.

That part of the apparatus on which the guide shell 10 is adapted to be mounted is not shown at it is not a part of the invention. However, it may be remarked that extending longitudinally of shell 10 are continuous divergent clamping faces 110 for attachment to a suitable clamp (not shown). In practice this sort of guide shell 10 is slidable on such a clamp so that a drill steel of substantially twice the length of the guide shell can be used continuously. The usual practice is to start with the guide shell clamped at its front end and with the drill at the rear, drilling until drill 12 reaches the front end of the guide shell, whereupon, leaving the drill in that position, the guide shell 10 is advanced with respect to the clamp so as to bring the drill again to the rear of the guide shell and continue drilling.

Thus, by the above construction are accomplished, the objects hereinbefore referred to.

I claim:

1. A mounting for a rock drill of the percussive type having a drill rod extending therefrom, comprising a guide shell slidingly supporting said drill, a centralizer for the drill rod slidingly supported by the guide shell, and means cooperative with said guide shell to advance said drill and said centralizer simultaneously at different rates of speed with respect to each other and the guide including a feed screw having two threads of different pitch one long and the other short engaging the drill and the centralizer respectively, and means to rotate said feed screw.

2. A mounting for a rock drill apparatus of the percussive type comprising: a drill; an elongate guide shell slidably supporting said drill; an elongate drill rod connected to and extending from said drill along said guide shell; a drill rod centralizer slidably mounted on said guide shell and supporting said drill rod; and drive means including a feed screw rotatably mounted on said guide shell and threadably engaging said drill and said centralizer, said feed screw having two superposed threads of different pitch with the larger pitch thread engaging and driving the drill and the small pitch thread engaging and driving the centralizer at a slower speed relative to the driving speed of the drill.

References Cited in the file of this patent

UNITED STATES PATENTS

| | | |
|---|---|---|
| 2,079,189 | Simpson et al. | May 4, 1937 |
| 2,434,120 | Paget | Jan. 6, 1948 |
| 2,644,669 | Curtis et al. | July 7, 1953 |
| 2,958,514 | Lee | Nov. 1, 1960 |